July 14, 1942.  E. C. HORTON  2,289,650

WINDSHIELD CLEARING SYSTEM

Filed April 1, 1939

INVENTOR
ERWIN C. HORTON
BY
Beau, Brooks, Buckley & Beau.
ATTORNEYS

Patented July 14, 1942

2,289,650

UNITED STATES PATENT OFFICE 2,289,650

WINDSHIELD CLEARING SYSTEM

Erwin C. Horton, Hamburg, N. Y., assignor to Trico Products Corporation, Buffalo, N. Y.

Application April 1, 1939, Serial No. 265,616

4 Claims. (Cl. 299—73)

This invention relates to a windshield or window washing system for motor vehicles.

In my Patent No. 2,142,056, granted December 27, 1938 on a Windshield clearing system, the disclosed embodiment utilizes a fluid pressure differential to retract a spring actuated plunger of a pump for subsequent release to effect the discharge of a predetermined quantity of liquid or cleaning fluid onto the windshield for clarifying the field of vision therethrough.

The present invention has for its object to improve the general construction and operation of the system so as to make the same practical for installation on the motor vehicle as well as more efficient in its operation.

In the drawing, which discloses a practical embodiment of the invention

Figure 1:
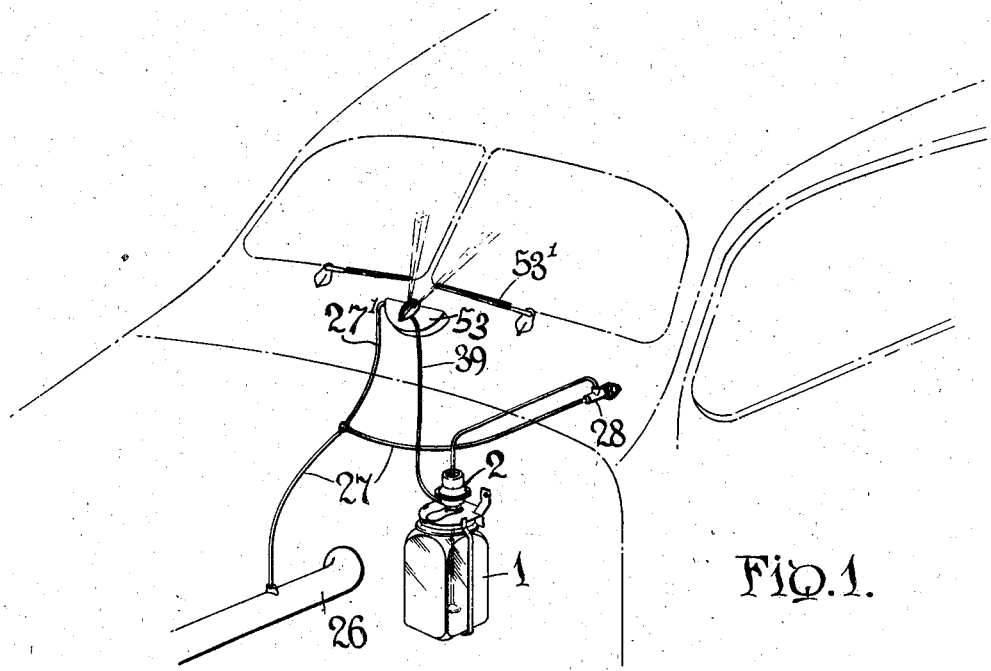
Fig. 1 is a phantom view of a motor vehicle depicting the windshield washer installed thereon.
Figure 2:
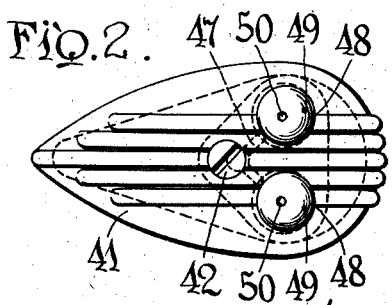
Fig. 2 is a plan view of the discharge unit or nozzle fitting designed for mounting on the cowl of the vehicle.
Figure 3:
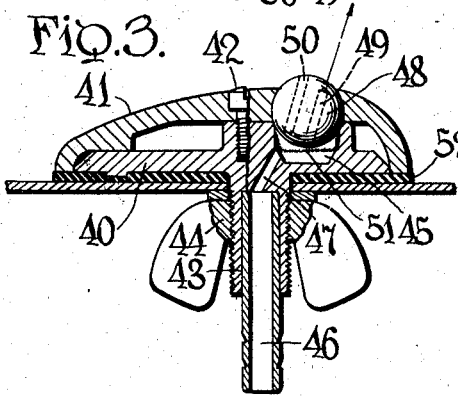
Fig. 3 is a vertical section therethrough.
Figure 4:
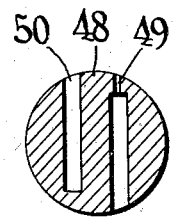
Fig. 4 is a sectional view through one of the ball jets.

Referring more particularly to the drawing, numeral 1 designates a reservoir and 2 a pump operating on suction in a manner substantially similar to that set forth in the above referred to patent. The suction operated pump is connected to the intake manifold 26 by means of the suction line 27 and is controlled by a valve 28 rendered accessible by mounting it on the instrument panel. A branch conduit 27' may lead to the windshield cleaner motor 53, if desired.

Connected to the pump outlet by a conduit 39 is a discharge unit which is preferably mounted on the cowl for ejecting the fluid on the windshield. Where the windshield is of the divided type, the discharge unit may be provided with dual jets mountable and demountable as an entirety. The preferred embodiment of the unit comprises a nozzle body having a mounting section 40 and a cap section 41 united by a screw fastener 42. The mounting section is formed with a depending tubular shank 43 which is externally threaded to receive a clamping nut 44 and is adapted for convenient connection with the conduit 39. The nozzle section 40 is provided with a pair of chambers 45 having communication with the shank passage 46 by ducts 47. Each chamber is formed with a seat to receive a ball 48 and these balls are held or clamped in place by the removable cap section 41. Each ball is formed with a jet opening or orifice 49 which may be adjustably directed toward the windshield, as by inserting a pin in the socket 50 after first loosening the screw 42. A fine screen 51 may be removably placed in each chamber 45 to prevent stoppage of the jet opening 49, and in mounting the unit on the cowl a soft gasket 52 may be used for practical reasons.

When it is desired to spray the windshield with the cleaning fluid the valve 28 is operated to open the suction line leading to the pump. This will effect a discharge of the liquid from the reservoir onto the windshield through the orifice 49 and during which time the usual wipers 53', may be operating for scrubbing and cleaning the windshield of vision obscuring matter.

While the invention has been described in detail, it is obvious that the inventive principles herein involved may assume other physical embodiments and consequently the invention as defined by the scope of the appended claims should not be restricted thereby.

I claim:

1. A discharge nozzle unit comprising a body provided with a fluid supply connection and a pair of seats communicating with said connection, a ball jet engaged in each seat, a cap section placeable on and liftable from the body for holding the two ball jets in their seats, and means independent of the cap section for exerting a clamping pressure on the latter, each ball being independently adjustable on its seat for adjusting the direction of discharge therefrom and simultaneously clamped at the given adjustment by said clamping means.

2. A discharge nozzle unit comprising a body provided with a fluid supply connection and a pair of seats communicating with said connection, a jet in the form of a ball engaged in each seat, a cap section removably engaged with the body for clamping the two ball jets in their seats, each ball being independently adjustable on its seat for adjusting the direction of discharge therefrom, said cap section being placeable on and liftable from the body and having a depending marginal flange encircling the body to conceal the same, and means exerting a clamping pressure on the cap section at a point within the marginal flange and equidistant from the balls.

3. A discharge nozzle unit comprising a body provided with a ball seat, a jet in the form of a ball universally mounted in the seat, and a cap section removably engaged with the body and the ball for holding the latter to its seat, and screw means securing the cap section onto the body for frictionally clamping the ball to its seat, said ball being formed with a jet orifice and an adjacent socket exposed through the cap section, the periphery of the ball being free from projections interfering with ball adjustment and said socket adapted to receive an instrument for adjusting the ball on its seat to direct the fluid issuing from the orifice.

4. A discharge nozzle unit adapted to be mounted on the cowl of a motor vehicle in front of a windshield for spraying a cleaning fluid thereon, comprising a body adapted to set upon the cowl and having a tubular mounting shank depending through an opening in the cowl and externally threaded, means engaging the threads of the shank to clamp the body in position on the cowl, the upper surface of the body being provided with a seat, a jet part mounted in the seat, a cap section removably engaged with the body and jet part for clamping the latter to its seat, and screw means clamping the cap section to the body, said screw means being arranged in substantial alignment with the depending tubular mounting shank whereby the clamping stresses of the screw means and the clamping means act in opposition to each other on the interposed portion of the body.

ERWIN C. HORTON.